Sept. 6, 1927.　　　　　　　　　　　　　　　　　　　　1,641,654
J. YUYAMA
METHOD AND MEANS FOR MEASURING VOLT AMPERES
Filed Oct. 24, 1925
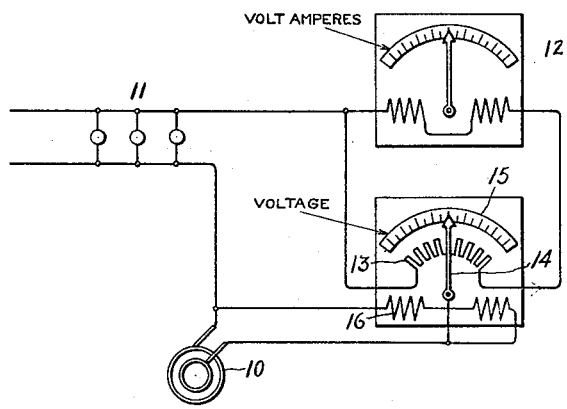
Inventor:
Juzi Yuyama,
by　*Alexander S. ...*
　　His Attorney.

Patented Sept. 6, 1927.

1,641,654

UNITED STATES PATENT OFFICE.

JUZI YUYAMA, OF OMORI, JAPAN, ASSIGNOR TO GENERAL ELECTRIC COMPANY, A CORPORATION OF NEW YORK.

METHOD AND MEANS FOR MEASURING VOLT AMPERES.

Application filed October 24, 1925, Serial No. 64,659, and in Japan April 20, 1925.

My invention relates to the measurement of the volt amperes flowing in an alternating current circuit. It oftentimes becomes desirable to obtain a measure of the product of volts and amperes in an alternating current circuit as distinguished from watts. If the power factor is always unity, this may be accomplished by an ordinary wattmeter but when the power factor is something less than unity, the wattmeter indication will likewise be something less than the true value of volt amperes. This will be evident from the formulæ for watts in an alternating current circuit which is E I cos θ where E is the voltage, I the current, and cos θ the power factor. My invention relates to a simple method and apparatus for obtaining a measurement of the volt amperes irrespective of power factor variations.

In carrying my invention into effect, I use a simple current measuring instrument connected in a circuit in which a current corresponding to one of the variables, for example the current is flowing, and then shunt an adjustable portion of such current around the meter. The portion thus shunted is made inversely proportional to the other variable, for example the voltage, so that the part flowing through the meter is always proportional to the product of the two variables, or to the volt amperes, and the meter is calibrated accordingly.

The features of my invention which are believed to be novel and patentable will be pointed out in the claims appended hereto. For a better understanding of my invention, reference is made in the following description to the accompanying drawing in which one arrangement for carrying out the invention is represented.

Since the voltage of a circuit is generally much more constant than the current, I prefer to measure a variable portion of the current, the part measured being made to vary in proportion to the voltage of the circuit. In the drawing is shown an alternating current source of supply represented as a generator 10 supplying a load represented at 11. 12 represents a current measuring instrument or meter which may obviously be an indicating or integrating device equipped with recording or demand attachments, if so desired. Connected between the terminals of instrument 12 is an impedance 13. Instrument 12 and impedance 13 are connected in one side of the load circuit through an adjustable rheostat arm 14 cooperating with the impedance 13 such that the load current divides, part going through the section of the impedance to the right of the arm 14 and through the instrument 12, and the remaining part going through that part of the impedance to the left of the arm 14 directly to the load. The outer end of arm 14 carries a pointer cooperating with a scale 15 and after the impedance is properly calibrated with instrument 12, scale 15 is marked in voltage units.

It will be evident that for a given position of arm 14 the current flowing through instrument 12 will be proportional to the total load current. The current flowing through the instrument 12 may also be made to have a component proportional to the voltage if, when the voltage of the circuit changes, the position of arm 14 is changed in the proper direction and amount. Thus the central position represented may represent the position for an average voltage, for example 110 volts. Let us assume that 10 amperes is flowing to load 11 and that with arm 14 in this central position, 5 amperes of this current flows through instrument 12 producing a deflection. The value of volt amperes is thus 1100 and the indication of instrument 12 is marked accordingly. Now, let us assume that the voltage increases to 120 volts, but that the load current remains 10 amperes. In order to give instrument 12 a deflection proportional to volt amperes which is now 1200, arm 14 must be adjusted to the right so as to allow enough more current to flow through instrument 12 to bring its deflection up to 1200. The new position of pointer 14 is marked 120 on scale 15. After scale 15 has been calibrated in this way and the arm 14 moved as the voltage changes so as to always indicate the circuit voltage, the instrument 12 will always give a deflection proportional to volt amperes. It will be apparent that arm 14 may be moved by hand or it may be moved automatically in proportion to the voltage. Consequently, arm 14 may be moved by a properly constructed voltmeter connected across the supply circuit and for this purpose voltmeter coils 16 are represented. The voltmeter deflection must be properly calibrated with the impedance 13 and instrument 12 to give the true value of volt amperes on instrument 12 and the contacting arrangement between arm 14 and impedance 13 must be arranged with negligible friction as compared to the torque of the voltmeter. It will be evident that the measurement is independent of changes in power factor.

In accordance with the provisions of the patent statutes, I have described the principle and operation of my invention together with the apparatus which I now consider to represent the best embodiment thereof, but I desire to have it understood that the apparatus shown and described is only illustrative and that the invention may be carried out by other means.

What I claim as new and desire to secure by Letters Patent of the United States is:

1. The method of obtaining a measurement proportional to the volt amperes of an alternating current circuit which consists in measuring a portion of the line current flowing in such circuit and varying such portion with respect to the total line current in proportion to the voltage of such circuit.

2. Apparatus for obtaining a measurement proportional to the volt amperes of an alternating current circuit comprising a circuit in which a current proportional to one of said variables is adapted to flow, a current measuring instrument and an impedance connected in parallel in said circuit, and means for varying the impedance so as to cause the division of current through said instrument to be proportional to the other variable.

3. Apparatus for obtaining a measurement proportional to the volt amperes of an alternating current circuit comprising an ammeter and an impedance connected in parallel in the circuit to be measured, and means calibrated with the voltage of the circuit for varying the impedance so as to give the current flowing through said ammeter a component proportional to the voltage of said circuit.

4. Apparatus for obtaining a measurement proportional to the volt amperes of an alternating current circuit comprising a current measuring device calibrated in volt amperes, an impedance connected in shunt to said device, and a volt meter for automatically adjusting said impedance.

5. Apparatus for measuring the voltamperes of a circuit comprising a current measuring instrument calibrated in voltamperes and means for shunting around said instrument that portion of the circuit current which is inversely proportional to the voltage of said circuit.

In witness whereof, I have hereunto set my hand this first day of October, 1925.

JUZI YUYAMA.